United States Patent
Garst

(10) Patent No.: US 7,373,291 B2
(45) Date of Patent: May 13, 2008

(54) LINGUISTIC SUPPORT FOR A RECOGNIZER OF MATHEMATICAL EXPRESSIONS

(75) Inventor: Peter F. Garst, Palo Alto, CA (US)

(73) Assignee: Mathsoft Engineering & Education, Inc., Needham, MA (US)

(*) Notice: Subject to any disclaimer, the term of this patent is extended or adjusted under 35 U.S.C. 154(b) by 777 days.

(21) Appl. No.: 10/368,766

(22) Filed: Feb. 18, 2003

(65) Prior Publication Data

US 2004/0015342 A1 Jan. 22, 2004

Related U.S. Application Data

(60) Provisional application No. 60/357,510, filed on Feb. 15, 2002.

(51) Int. Cl.
*G06F 17/27* (2006.01)

(52) U.S. Cl. .......................... 704/4; 704/10

(58) Field of Classification Search .................. None
See application file for complete search history.

(56) References Cited

U.S. PATENT DOCUMENTS

| | | | |
|---|---|---|---|
| 5,182,709 A | 1/1993 | Makus et al. | |
| 5,317,647 A * | 5/1994 | Pagallo | 382/161 |
| 5,428,805 A | 6/1995 | Morgan et al. | |
| 5,544,262 A | 8/1996 | Pagallo et al. | |
| 5,655,136 A | 8/1997 | Morgan | |
| 6,243,669 B1 * | 6/2001 | Horiguchi et al. | 704/9 |

FOREIGN PATENT DOCUMENTS

WO   PCT/US03/05061   11/2003

\* cited by examiner

*Primary Examiner*—Abul K. Azad
(74) *Attorney, Agent, or Firm*—Ralph A. Loren; Edwards Angell Palmer & Dodge LLP

(57) ABSTRACT

The present invention provides a new source of information, linguistic models, to improve the accuracy of mathematical recognition. Specifically, the present invention is an extension of linguistic methods to the mathematical domain thereby providing recognition of the artificial language of mathematics in a way analogous to natural language recognition. Parse trees are the basic units of the mathematical language, and a linguistic model for mathematics is a method for assigning a linguistic score to each parse tree. The models are generally created by taking a large body of known text and counting the occurrence of various linguistic events such as word bigrams in that body. The raw counts are modified by smoothing and other algorithms before taking their place as probabilities in the model.

27 Claims, 8 Drawing Sheets

LINGUISTIC SUPPORT FOR A RECOGNIZER OF MATHEMATICAL EXPRESSIONS

CLAIM OF PRIORITY/CROSS REFERENCE OF RELATED APPLICATION(S)

This application claims the benefit of U.S. Provisional Application No. 60/357,510, entitled "Linguistic Support for a Recognizer for Handwritten Mathematics," filed on Feb. 15, 2002, which is further incorporated in its entirety herein by reference.

STATEMENT REGARDING FEDERALLY SPONSORED RESEARCH OR DEVELOPMENT

The funding for work described herein was provided by the Federal Government, under a grant from the National Science Foundation. The Government may have certain rights in the invention.

BACKGROUND OF THE INVENTION

1. Field of the Invention

This invention relates to the field of pattern recognition, and specifically to the recognition of mathematical expressions.

2. Description of Related Art

Prior art recognizers, such as speech recognizers or recognizers for handwritten text, have profitably used the linguistic structure of the language they attempt to recognize. The linguistic information consists in the first place of a list of the known words, so that the recognizer does not report nonsense words. After this basic step, the most common formulation of linguistic knowledge for natural language recognizers is N-gram models, which specify probabilities for words, or word pairs, word triples, and so on. These are based on the observation that certain word sequences are more likely than others; for example, having recognized "Humpty" the system can make a good guess about the next word. N-gram models can also be applied at the character level for handwriting. There are other types of linguistic models which attempt to capture some of the structure of the language, for example with the use of context free grammars.

In using linguistic information, the natural language recognizer decides between a number of possibilities which get relatively good scores based on the speech signal, handwriting signal or other input. The recognizer can find the probability assigned to each such possibility by the linguistic model, and boost those probabilities that have high linguistic scores. This then enables the recognizer to distinguish between phrases like "I must put on a coat" and "I must put on a goat".

Mathematical expression recognition is the process of finding a mathematical expression described by ambiguous signals. It has applications in a number of areas. For example, U.S. Pat. Nos. 5,428,805 and 5,544,262 describe a calculator on which the user can write a mathematical expression; the calculator then attempts to recognize the expression, and once recognized computes and displays an answer. In this case the ambiguous signals are the user's pen strokes.

The publications, Fateman and Tokuyasu, "Progress in recognizing typeset mathematics," Proc. SPIE 2660, pp. 37-50, 1996 and Fateman, Tokuyasu, Berman and Mitchell, "Optical character recognition and parsing of typeset mathematics," J. Visual Commun. Image Represent. 7, pp. 2-15, 1996, describe a system which scans pages of old technical journals and attempts to recognize the equations as well as the text. In this case the ambiguous signals are the bit mapped images of the equations.

The input data for a mathematical recognizer, such as a handwritten or scanned mathematical expression, is ambiguous in many ways, and in order for the output of the recognizer to be useful to the ultimate application this ambiguity must be reduced or eliminated. For example, an application that wants to perform a calculation must know the symbols exactly, and also know the mathematical structure of the expression. A text formatting application primarily needs the identity and position of the symbols, but even in this case it must understand at least something of the semantics of the expression—"sin" will typically be formatted differently depending on whether it is a trig function or a product of three variables.

Whatever the application, ambiguity is a constant companion in recognizing mathematical notation. There is ambiguity in the characters—is that ink stroke a 2 or a z? There is ambiguity in the placement of the characters. There is also syntactic ambiguity—is f(x) a function application or a multiplication? Because of the ambiguity involved with mathematical notation, a recognizer of mathematical expressions can rarely report a single clear answer; rather it must choose a best among a number of possible answers based on whatever information it has available. Thus, there is a long standing need to improve the accuracy of mathematical recognition.

SUMMARY OF THE INVENTION

The present invention provides a new source of information, linguistic models, to improve the accuracy of mathematical recognition. Specifically, the present invention is an extension of linguistic methods to the mathematical domain thereby providing recognition of the artificial language of mathematics in a way analogous to natural language recognition. Parse trees are the basic units of the mathematical language, and a linguistic model for mathematics is a method for assigning a linguistic score to each parse tree. Just as important as the nature of the linguistic model is the source of information that drives it. The models are generally created by taking a large body of known text and counting the occurrence of various linguistic events such as word bigrams in that body. The raw counts are modified by smoothing and other algorithms before taking their place as probabilities in the model.

The above-mentioned aspect(s) and other aspects, features and advantages of the present invention will become better understood with regard to the following description, appended claims, and accompanying drawings.

BRIEF DESCRIPTION OF THE DRAWING(S)

Referring briefly to the drawings, embodiments of the present invention will be described with reference to the accompanying drawings in which.

DETAILED DESCRIPTION OF THE PRESENT INVENTION

Figure 1:
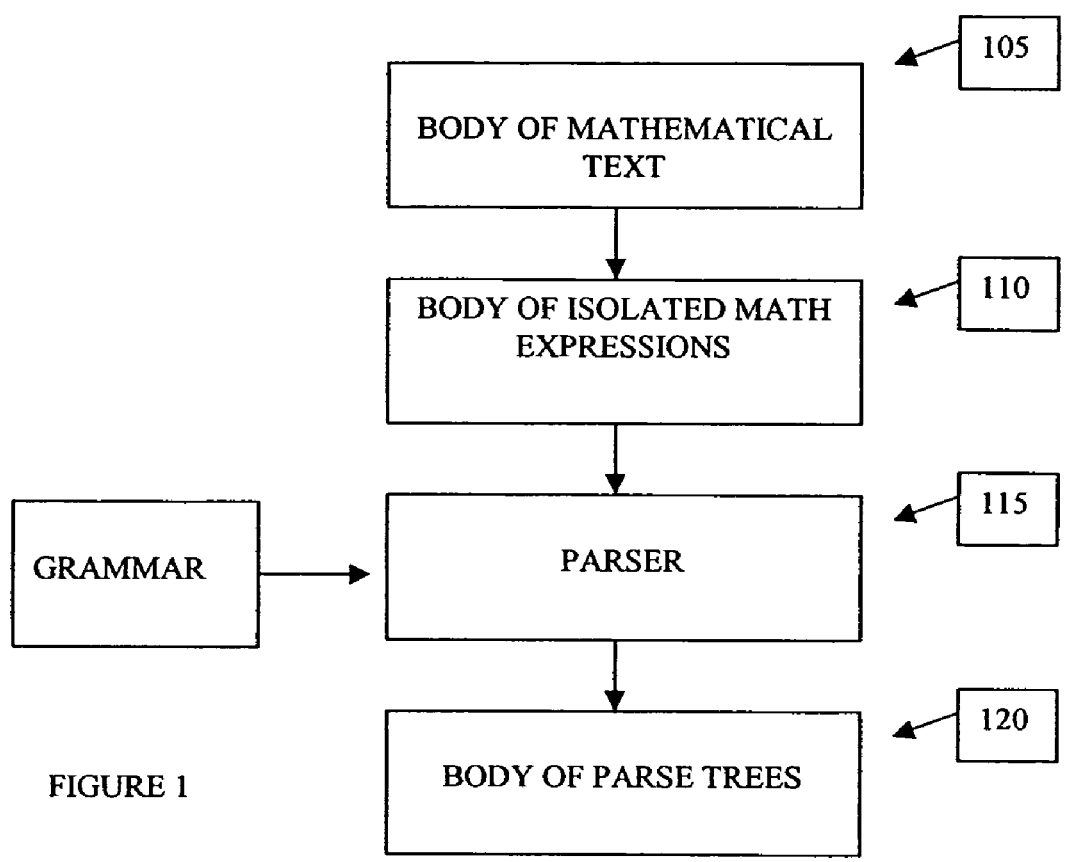
FIG. 1 depicts a flow diagram illustrating how mathematical information is processed to provide a body of parse trees for use in training linguistic models of mathematical notation in accordance with the present invention.

Referring more specifically to the drawings, for illustrative purposes the present invention is embodied in the system configuration, method of operation and application code, generally shown in FIGS. 1-8. Application code may be embodied in any form of computer program product. A computer program product comprises a medium configured to store or transport computer readable code, or in which computer readable code may be embedded. Some examples of computer program products are CD-ROM disks, ROM cards, floppy disks, hard drives, magnetic tapes and carrier waves.

It will be appreciated that the system, method of operation and product described herein may vary as to the details without departing from the basic concepts disclosed herein. Moreover, numerous specific details are set forth in order to provide a more thorough description of the present invention. However, all specific details may be replaced with generic ones. Furthermore, well-known features have not been described in detail so as not to obfuscate the principles expressed herein. While exemplary embodiments of the present invention described herein may be directed to a particular development environment, the invention is not limited thereby as one skilled in the art can readily adapt the concepts presented herein to a preferred development environment. Therefore, other programming languages, platforms and architectures, etc. fall within the scope of the present invention.

Overview

To generate a linguistic model, the present invention uses textual material such as a database of previously parsed mathematical expressions. Statistics derived from this database are then used to determine appropriate linguistic model parameters. The database may be taken from sources such as technical papers, books, patents, previous system inputs, etc. Whatever the source, the mathematical expressions it contains are parsed and converted to parse trees for the recognition system grammar, and the set of parse trees obtained constitutes the database for training. Some forms of input, for example MathML input, may be essentially parsed and ready to use with little preparation, while others may require more extensive processing. MathML, a product of the W3C Math Working Group, is a specification for describing mathematics as a basis for machine to machine communication.

The parameters of each of the linguistic models can be based on counting events in the database of expressions. A bigram model's parameters are based on counting bigrams to find their raw probability in the database; a rule context model is based on counting each type of subnode for each rule position. Given the database and the model structure, counting appropriate linguistic events in the database works to get raw probability numbers which can be smoothed and otherwise processed as outlined above to produce a usable linguistic model.

Mathematical Language

A preferred embodiment of the present invention uses sets of mathematical expressions described by context free grammars. There is presumably no single grammar describing all of mathematical notation as it is used by all its students and practitioners, however for the purposes herein we will assume that a context free grammar describes some more restricted problem domain addressed by some application served by a mathematical recognizer. For the purposes herein, each rule of the grammar also has geometric information attached, to enable the recognizer to judge whether some input matches the positional pattern of the rule as well as the symbol sequence. Such well known techniques are described in the literature. For example, see the publication, Chou, "Recognition of equations using a two-dimensional stochastic context-free grammar", Proc. SPIE Visual Commun. Image Processing IV, 1199, pp. 852-863, Philadelphia, 1989, which is hereby incorporated by reference in the entirety herein.

It will be apparent to the knowledgeable reader that most of the techniques described here, or their minor variations, are readily extensible to descriptions of mathematical notation which are not grammar based.

For example, a very simple grammar for a small set of mathematical expressions might look like this:

| | |
|---|---|
| expr: | add \| minus \| fraction \| times |
| add: | expr + expr |
| minus: | expr − expr |
| fraction: | expr—expr |
| times: | expr expr |
| expr: | letter |
| expr: | integer |
| integer: | digit |
| integer: | integer digit |
| digit: | 0 \| 1 \| 2 \| 3 \| 4 \| 5 \| 6 \| 7 \| 8 \| 9 |
| letter: | x \| y \| z | with associated information specifying the relative positions of the elements. The positional information may be a strict constraint, or a looser statistical model of the expected positions. The vertical bar in the rules indicates "or". The symbols that actually appear on the page, like + or x, are called terminal symbols; other symbols like expr are called nonterminal symbols, and are abstractions which do not appear on the page. There are reasons besides its limited expressive power that this is not suitable as a grammar for a real recognizer, but it will serve to illustrate many of our methods.

The answer produced by a mathematical recognizer is generally exhibited as a parse tree produced by a parser, which shows the complete derivation of the expression. (The parse trees can then be used as input to a calculator, text formatter, or other useful tool.) The parser is described in more detail in the section immediately following this one.

Because the rules used in the derivation have associated positional patterns, the parse tree includes information on the identities and placements of the symbols in the expressions. It also shows the logical structure of the expression. For example, a parse tree for "2x" might look like

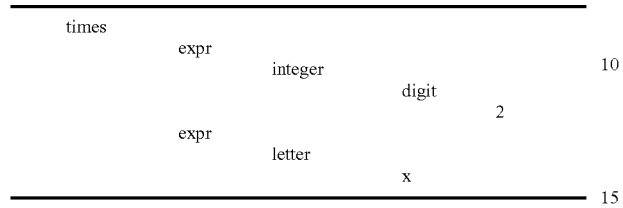

Here each line has a terminal or nonterminal symbol, and in the case of nonterminals the symbols below it with one additional indent are the ones used to rewrite it. For example, the top rule for this parse tree is "times: expr expr". In certain situations, "collapsed" parse trees may also be used, with all singleton rules removed. For example, the above parse tree can be collapsed to
times
  2
  x Parse trees are the basic units of the mathematical language, and a linguistic model for mathematics is a method for assigning a linguistic score to each parse tree.

Basic Linguistic Models for Mathematics

The following sections describe several linguistic models utilized by the present invention.

N-Gram Models

N-gram models for natural languages are familiar, but some modifications are required to apply them to mathematical language.

The simplest N-gram model is the unigram model. For this model each parse tree maps to a set of tokens. A token, in this context, is often a single symbol, like a digit or an integral sign. There is some flexibility in what is chosen as a token. "Start" and "End" tokens may be designated to indicate the boundaries of the expression. Common functions, like "sin" or "cos," may be treated as single tokens or broken up into their letters. In addition, the rules at interior nodes of a parse tree may be deemed tokens. Thus, if in a unigram model only symbols are treated as tokens, the expressions "2x" and "x²" map to the same set of tokens. However, the expressions become distinct if the rules at interior nodes are also treated as tokens.

For a unigram model each token is an independent linguistic event, and the model assigns a probability to each possible linguistic event. Thus to use a unigram model to generate a probability for a parse tree, we first map the parse tree to a set of tokens as defined by the model. Each token represents an independent linguistic event, so the probability of the parse tree is just the product of the probabilities of the individual events.

In a bigram model, a linguistic event is a pair of tokens, which is just called a bigram in this context. Unlike natural language, however, in which a bigram represents a pair of adjacent words, there is no natural ordering of tokens in a mathematical expression. Instead, any convenient fixed ordering may be used. For example, a fraction may be ordered as "numerator line denominator" or to capture more linguistic structure, a fraction may be ordered as "line numerator denominator".

Given a bigram model, which includes policies on what constitutes a token and how the tokens used in a parse tree are ordered, a parse tree is mapped to a linear sequence of tokens. The probability of the parse tree in the bigram model is then a product of conditional probabilities, the probability of each bigram given the previous one. The sequence is started by the unconditional probability of the first bigram, which may be a bigram using the start token if there is one. That is, given a parse tree T which maps to a bigram sequence $b_0, \ldots, b_n$, the model assigns probability $$P(b_0) \prod_{i=1}^{n} P(b_i \mid b_{i-1})$$

One can continue in this way to get higher order N-gram models.

Stochastic Grammar Models

Another conventional approach to linguistic modeling is to define the linguistic events to be expansion by grammar rules rather than configurations of tokens. The probabilities assigned to the rules reflect the fact that each nonterminal symbol must be rewritten using one of the possible rules. For example, there may be two rules for the nonterminal "integer":
integer: digit
integer: integer digit These two rules must have probabilities which add to 1. This requirement is formalized by noting that if R(s) represents the set of grammar rules which rewrite the nonterminal symbol s, then $$\sum_{r \in R(s)} P(r) = 1$$

Every interior node of a parse tree represents the application of a grammar rule; and in this formulation the probability assigned to the parse tree is just the product of the probabilities of the rules used in the parse tree. The probabilities of individual symbols are subsumed in this framework, since some of the rules in the parse tree will look like "letter: x", and assigning a probability to this rule is essentially like assigning a probability to the symbol x.

The method introduced in this invention of encoding a language model for a body of mathematical expressions in the rule probabilities is novel.

Rule Context Models

The rule context model is an extension of the stochastic grammar model that provides more detailed modeling. Note that a stochastic grammar model would assign the same probability to the expressions "2x" and "x2," because the individual symbols would be hidden under a chain of singleton reductions, even though a reader will recognize that the first expression is more likely than the second.

In rule context models, collapsed parse trees are used with all singleton reductions removed. The collapsed parse trees will contain the same information as the full parse trees provided that there are no ambiguous chains of singleton reductions in the grammar. This means that there are no two symbols S and T, with two different chains of singleton reductions leading from S to T. This is a property of a grammar which may be easily checked, and which can normally be expected to hold.

A rule context model associates a discrete probability distribution over all symbols and all non-singleton rules (that is, rules with more than one symbol on the right hand side) in the grammar with each position in each non-singleton rule. The combination of the rule, position and probability distribution will be called a node. A linguistic event for this model is the occurrence of a particular symbol or nontrivial rule at a specified position in a specified rule. For example, in the implicit multiplication rule there will be a distribution over all rules and symbols at the first position, and one at the second position. The probability of the symbol 2 will be higher in the first position than the second position (for typical mathematical expressions), so that the expression "2x" would be rated more likely than the expression "x2." Of course, some of the probabilities may be zero. In the extreme case of a terminal symbol in a rule, the probability of the terminal symbol would be 1 in the distribution at that rule position and all the other probabilities would be 0, so in fact the whole node at that position could be dropped for purposes of linguistic modeling.

There is also a single "root" distribution for the probability of the root node of the collapsed parse tree. In practice it may be convenient to have a few other special nodes like the root node, for example for matrix entries or for reserved words.

Given a rule context model and a collapsed parse tree, it is straightforward to compute the probability associated with the parse tree. At the root node, the probability of the root rule or symbol in the root distribution is found. Then at each internal node of the parse tree the probability of the rule or symbol at each rule position is found using the distribution for that rule position. Multiplying all these probabilities together produces the probability for the whole parse tree. For example, in the collapsed parse tree
times
2
x the probability that would be assigned by a rule context model is the product of three terms drawn from three different distributions, that is the probability of the times rule in the root node; the probability of "2" in the node at the first position in the times rule; and the probability of "x" in the node at the second position in the times rule.

Note that it is also sometimes useful to have more general probability distributions attached to the rule positions in a rule context model. For example, in most cases, the rule context model is not very good at preventing the common confusion between the "+" symbol and the letter "t". The parse tree of most grammars for an expression like "atb" would only treat two of the symbols at a time. So the rule context model would not "see" the whole pattern. However, the elements of the distribution attached to the rule positions could include not only symbols and rules, but other linguistic events, like "product ending in t". With this addition the confusable case becomes manifest, and can be treated using the linguistic methods of this invention. Other modifications in a similar spirit are possible.

Collocation Models

Another type of linguistic model which captures some of the structure of the mathematical language is a collocation model. It looks for related rules or symbols in related parts of an expression. For example, if the first part of an addition operation includes the symbol x, the second part is far more likely to include the symbol y than one would expect just from the unigram frequency of y.

Given a context free grammar for some set of mathematical expressions, one can specify a list of collocations by giving pairs of symbols on the right hand side of rules. The same collocation can also be applied to different rules. For example, a collocation can be specified by using the two terms in the addition rule. If a collocation also exists for the two terms in the subtraction rule, the subtraction rule collocation can be a separate collocation with separate statistics, or pooled with the addition rule and the same collocation made to apply to both.

A collocation model includes unigram distributions for the first and second positions in the collocation, and a bigram distribution for the two positions. Given a pair of symbols, say x and y, the number of bigrams expected may be determined given the unigram probabilities and assuming their presence was unrelated. If there are more (x, y) bigrams than expected from the unigram probabilities, an "excess probability" of the bigram over what is expected is computed. Note that the there may be rules in the collocation model. For example, if the first term of an addition involves an exponent expression, it may be that the second is more likely to as well.

Collocation models are different from the other linguistic models considered herein in that the collocation models do not lead to a probability distribution over parse trees, since the models only apply to occasional pairs rather than the whole tree. Nonetheless, the linguistic information may be used to boost the score of a proposed recognition by an amount related to any "excess probability" calculated in collocation pairs inside the proposed parse tree.

FIG. 1

FIG. 1 illustrates how mathematical information is processed to provide a body of parse trees associated with a specific grammar for use in training linguistic models of mathematical notation.

At 105, the process begins with input of a body of mathematical text. This may be a group of papers or books which contain many mathematical expressions, and it could be in a number of formats, such as text files with $T_EX$ or MathML expressions, or files in a particular word processor format. $T_EX$ and its many extensions such as La $T_EX$, etc, is a quality typesetting system that produces typeset documents of the highest quality. It is particularly strong on complicated mathematics.

At 110, the body of mathematical text is reduced to a collection of isolated mathematical expressions. Besides stripping away the non-mathematical material from around the mathematical expressions, macro substitutions and other conventional preparation steps may be involved, depending on the format of the input.

At 115, the parsable isolated math expressions are parsed to produce a set of parse trees, using a grammar specified to match the end application. Not all expressions will be parsable, but each one that is results in a parse tree. The parser will typically be one which can handle ambiguous input, such as Earley's algorithm or the CYK algorithm. The details of the parser matches the format of the input material, for example, using $T_EX$ input data, the isolated expressions are preprocessed into shallow trees having terminal symbols at the leaves and the internal nodes of the tree representing $T_EX$ grouping operators like { } or $T_EX$ positional operators like—or ^.

The parser may be modified by hand (fine tuned) to make the parses of ambiguous expressions match what is expected. There are two techniques used to do this. One is to attach penalties or bonuses to some rules. For example "sin x" is parsed as a function rather than the multiplication of four variables because the function rule gets a bonus which gives it an edge over the multiplication. The other is to use an attribute grammar, which tracks properties of subexpressions such as numeric or overall complexity. For example, "22" is parsed as a single integer, rather than a product of two integers because the product rule does not allow both operands to have the numeric attribute set. Also, "sin x sin y" is not parsed as "sin (x sin y)" because the parser checks for complex products as function arguments in this case and penalizes these. This system of attributes and penalties can be tuned by looking at how the parser operates on sample input material, and adjusting it until the parser agrees with human judgment.

At 12, the resulting body of parse trees is preferably stored as a database to be used to train linguistic models.

FIG. 2

Figure 2:
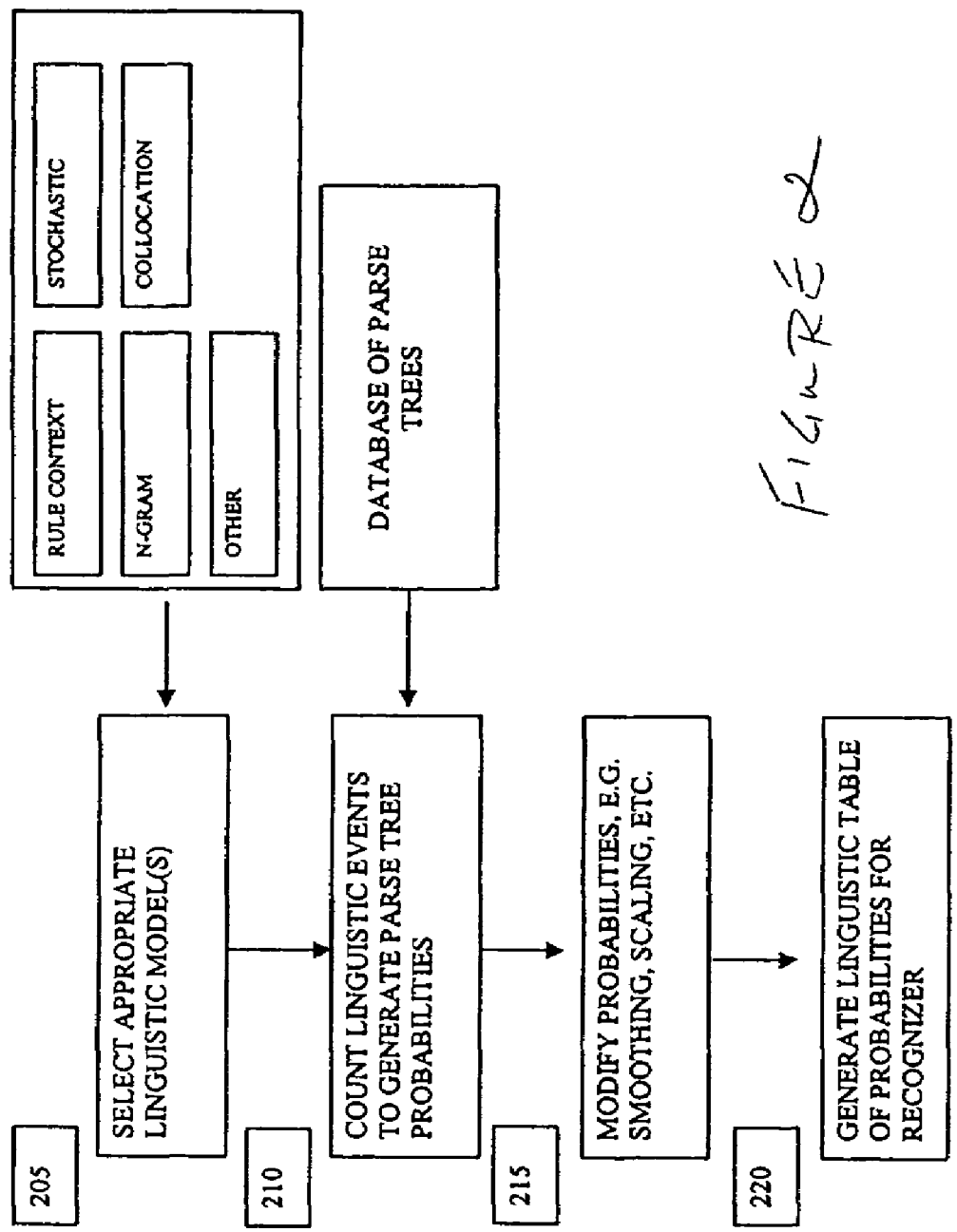
FIG. 2 depicts a flow diagram illustrating the process of training linguistic models in accordance with the present invention.

Each linguistic model type is based on a set of counts—for the occurrences of terminals or rules at a specified rule position, or for the number of collocations, or for other linguistic events. FIG. 2 illustrates the process of training linguistic models.

At 205, based on the database of parse trees for a specific grammar, a user selects an appropriate linguistic model to train, e.g. rule context model, stochastic grammar model, n-gram model, such as a unigram or bigram model, collocation model, or some other basic model type.

At 210, each occurrence in the database of a linguistic event associated with the selected model is counted to generate probabilities for each of the linguistic events.

At 215, if required, the probabilities are further refined using an appropriate method, such as smoothing and/or scaling. Some linguistic models have a large number of parameters, and it is difficult to get accurate estimates of all of them. Because of this the parameters of the models may be smoothed estimates rather than actual probabilities. There are a number of smoothing techniques in the literature for natural language modeling, such as Good-Turing and deleted interpolation, and these may be applied here also.

At 220, the probabilities are packaged as linguistic tables for use in a recognizer.

What now follows is an example of how a rule context linguistic model is structured, trained and used in accordance with the principles expressed herein.

Consider a simple grammar, where the rules are named r0, r1 . . . rN. Here, the terminal symbols are "2" and "x".

| r0. | start:expr |
| r1. | expr:primary |
| r2. | expr:expr + primary |
| r3. | primary:term |
| r4. | primary:primary term |
| r5. | term:2 |
| r6. | term:x |

For each rule with right hand side length greater than 1, plus the start rule, there is a discrete probability distribution for each position on the right hand side. The elements of the discrete distributions in this case are:

| r0: | [r2, r4, 2, x] |
| r2: | [r2, r4, 2, x] |
| | [+] |
| | [r4, 2, x] |
| r4: | [r4, 2, x] |
| | [2, x] |

The above means, for example, that a probability will be determined that there will be another product, a "2", or an "x" in the first position in rule 4. The domain of a distribution includes all possible terminal symbols or rules of length greater than one which are derived from a specific rule position.

Determining probability values starts with a linguistic database of parse trees. In the example above, given a set of parse trees for the grammar, the number of hits in each bin are counted. For example, if a parse tree has an internal node labeled with the rule r4, search down the tree under the first rule position to see if there is another product, or a 2 or an x, and increment the count in the bin accordingly. The simplest probability assignment is the observed probability in the linguistic database. However, observed probability values can be further modified by applying smoothing algorithms, or using other information, for example, as when local and global models are merged (see below) or the models are adapted over time.

Once probability values are determined they are mapped to linguistic scores. A typical mapping would be to use negative log probability as a score; but the mapping is for the convenience of the algorithm which combines scores from different system components, and other mappings may be chosen. Then the model may be applied in a recognizer, which is attempting to assign a parse tree to ambiguous input, for example from handwritten input or scanned input. This model assigns a linguistic score to each parse tree, and so the recognizer can favor higher scoring parse trees over lower scoring trees. Typically the recognizer would consider various sources of information, and would weigh this linguistic information as one source, using a method as outlined below.

Figure 3:
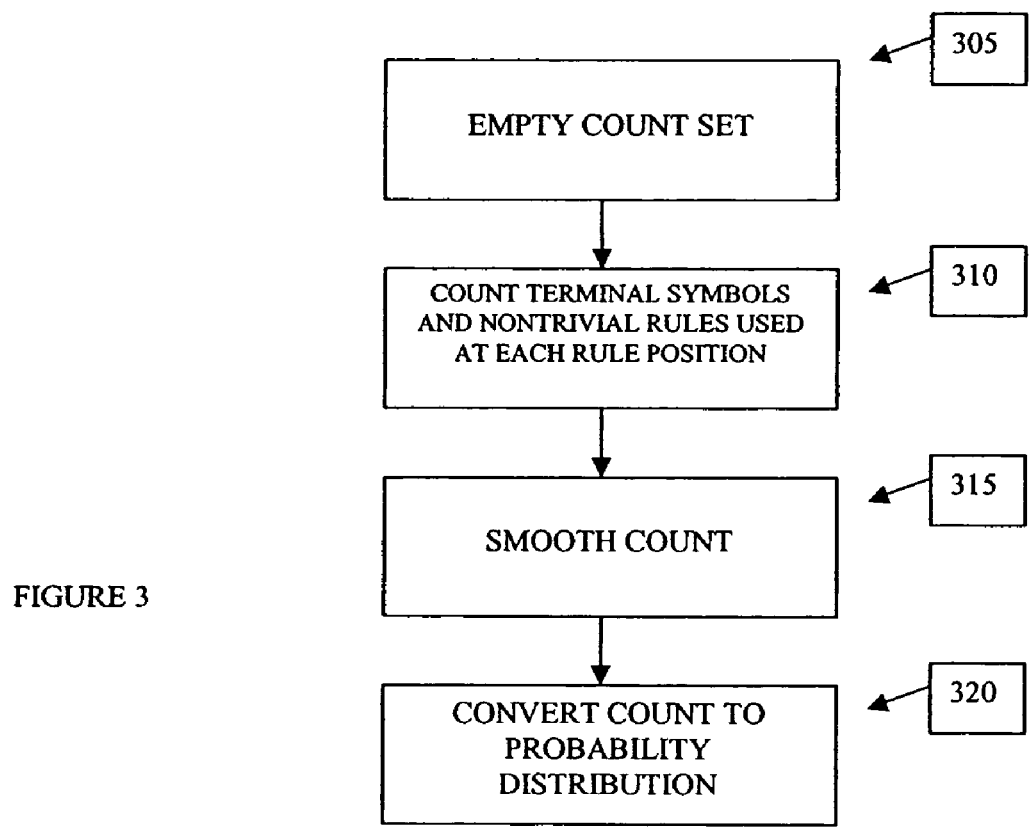
FIG. 3 depicts a flow diagram illustrating how a rule context linguistic model may be trained in accordance with the present invention.
Figure 4:
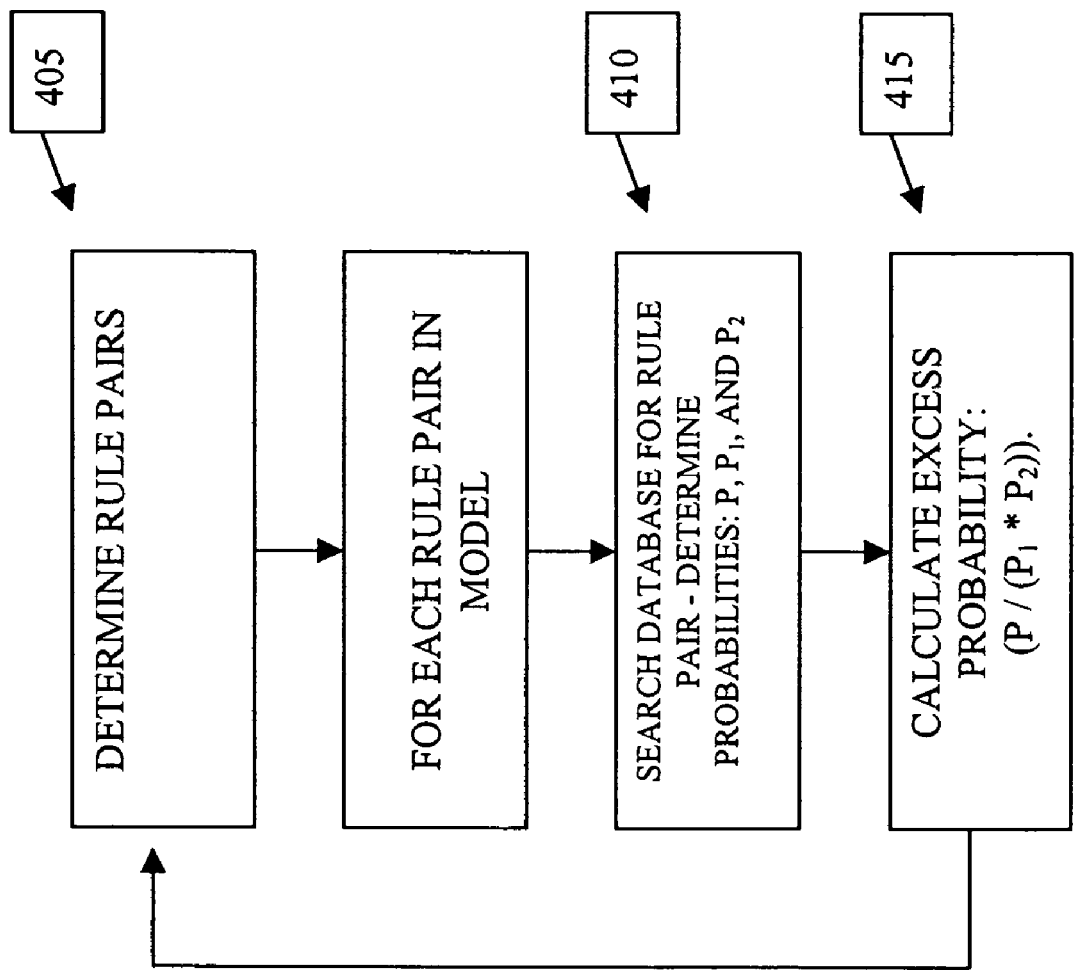
FIG. 4 depicts a flow diagram illustrating how a collocation linguistic model may be trained in accordance with the present invention.
Figure 5:
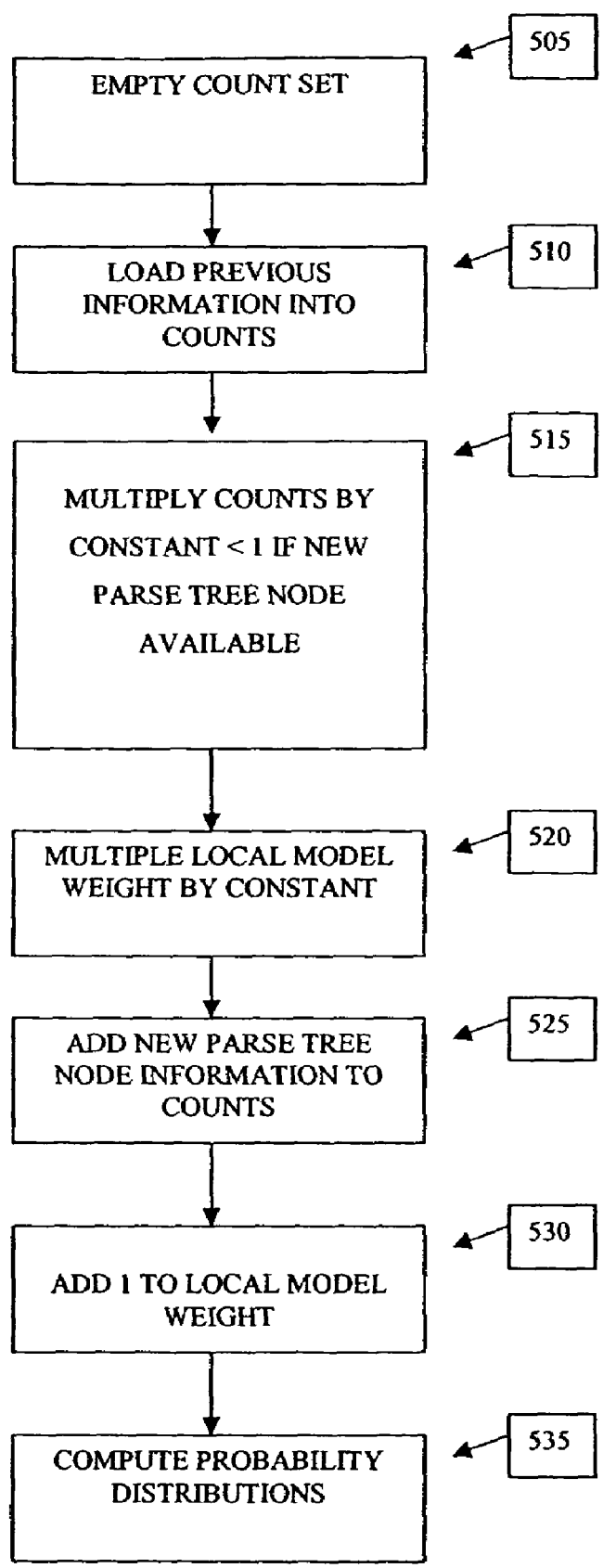
FIG. 5 depicts a flow diagram illustrating how a local linguistic model may be trained in accordance with the present invention.

FIGS. 3-5—Training Examples

FIGS. 3-5 are additional examples of how specific linguistic models may be trained in accordance with the present invention.

Rule Context Model

As shown in FIG. 3, a rule context model may be trained as follows:

At 305, start with a database of collapsed parse trees, and an empty count for each element of the domain of each probability distribution in the rule context model. For edification, a probability distribution is a function which assigns a probability to each member of a set, for example to each element or symbol.

At 310, for each interior node in all the parse trees, count the terminal symbol or nontrivial rule which first expands each position in the rule at that node. Also count the first nontrivial expansion of the start node in the root distribution of the model. This leads to a count for each element of the domain of each probability distribution in the rule context model.

At 315, smooth the counts for each element of the domain of each probability distribution using an appropriate method, such as Good-Turing.

At 320, convert the smoothed counts to a discrete probability distribution on the domain for each distribution in the model.

Collocation Model

As shown in FIG. 4, a collocation model may be trained as follows:

At 405, search the database of parse trees to find all examples of one of the rule element pairs specified in the collocation model.

At 410, for each symbol or class pair, determine the probability $p_1$ that the first part of the pair occurs in the first part of a rule element pair; the probability $p_2$ that the second part of the pair occurs in the second part of a rule element pair; and the probability p that both parts appear in the two halves of a rule element pair.

At 415, for each symbol or class pair, calculate the excess probability for the symbol or class pair using the ratio $(p/(p_1*p_2))$.

Local Model

A linguistic model may be adapted to the user by training a local model, and then using a weighted combination of the global model (which shipped with the system) and the local model.

First suppose that a local model representing recent input by the user is computed. The local model has a "weight" w representing the approximate number of parse tree nodes used to generate it. A combination of the local and global scores is then used for the total linguistic score, where the portion coming from the local score increases with the weight w and asymptotically approaches some predetermined percentage.

As shown in FIG. 5, a local model may be trained as follows:

At 505, start with an empty count set—that is, zero for all counts.

At 510, if there is previous information for the user, load it into the counts. For example, if the user loads a document the counts in the document can be used, or there may be saved information for the user.

At 515, when there is a new parse tree node available for the user, from a recognized expression or one the user entered into the system some other way, decay the current set of counts by multiplying them all by some constant c less than 1.

At 520, multiply the current weight of the local model w by constant c.

At 525, add the information from the new parse tree node to the set of counts.

At 530, add 1 to the current weight of the local model w.

At 535, whenever the local model is needed by the recognizer, and the counts have changed since the last use, compute the probability distributions without smoothing.

In another embodiment, the local model would be decayed on a regular basis, say every N nodes, rather than after every new node.

Additional Considerations

There are a number of ways these models can be combined and used in a recognizer.

Contexts

The linguistic models may be made more precise by applying them only to specific parts of expressions. For example, the types of expressions that are expected in exponents will be somewhat different from the general run of expressions. Similarly, the types of expressions that are expected as arguments to trig functions would be different than general expressions. Therefore, to capture this source of linguistic information, several linguistic models may be used. Each one is called a context, and is attached to one or more symbols on the right hand side of grammar rules, or to a non-terminal symbol. For example, one context can be attached to exponents and another to subscripts, or the same context can be attached to both. Thus, using the rule expr: trig_func arg a context called "trig_func arg" may be attached to the arg symbol on the right hand side. Further, there is a "remainder" model for all the material not in one of the contexts.

When computing the linguistic score of a parse tree, each portion of the parse tree is scored according to the appropriate context. This allows more precise tailoring of each context model to a particular type of expression, and so more precise linguistic modeling. As many contexts as desired may be added, as long as more accurate models are generated.

Each context model may be of any type—for example, an N-gram model, rule context model, etc. Each context model is trained using the standard procedure for its model type, except that the parse trees used to train it are taken just from the sub-expressions described by the context rather than from the whole database.

Combining Models

In applying linguistic modeling to mathematical expression recognition one must decide how much credence to give the information from the linguistic model. That is, given a score based directly on the input signals, for example by shape matching or testing the positions of parts of the input, and a linguistic score, how should they be combined to produce a single decision? It is possible to use more than one linguistic model at the same time. For example, a collocation model and another linguistic model can both be used to give different information about the recognition. In this case there are more than two scores to combine.

Thus the combination problem may be summarized as follows. When trying to recognize unknown input, we have estimated probability values from one or more linguistic models, and we have scores from other system components, such as the position tables and the shape tables. We wish to combine this information into a single score with which to judge the likely identity of the input. The recognizer must have an algorithm to effect this combination.

The first step is usually to map the probability values from the linguistic models to linguistic scores. This mapping is for the convenience of the combination algorithm, and its form is determined by that algorithm. Sometimes the algorithm uses probability values directly. Often it uses the negative log probability, which behaves like a distance measure. Sometimes it further processes the information, for example to fix the mean or variance of the linguistic information.

There are a number of standard methods which may be used for the combination algorithm. For example, the system might include a neural network which acts as a function mapping the set of scores for the different system components to a single overall score. The parameters of such a neural network would be determined by a training procedure based on a body of appropriate training data, such as a labeled database of handwritten mathematics or scanned mathematics. Once the parameters were determined at training time, the neural network would be used by the recognizer at recognition time to combine the scores. There are other standard methods that could be used in place of a neural network, including even a simple linear combination. The overall approach is the same for each.

As noted above, there are different ways to combine the scores. The system could run the initial recognitions and then use linguistic scores to reorder the possible results, or it could build the linguistic scores into the system so that it produced a result combining both types of score. There are also intermediate points possible. For example, one linguistic model could be applied integrally during recognition and another as a postprocessing step. The essential point is that information from these various sources is combined to make a decision, not how they are combined.

For the readers understanding, the following section further explains the above discussion.

The score generated by a linguistic model is combined with scores generated by other sources of knowledge, such as a position model or a shape model, to arrive at a final decision about the most likely identity of an unknown input. The method for combining the scores may be a simple linear combination or a fancier method. In general, if one source of knowledge ranks two possibilities about equally then the other sources will probably dominate the decision; conversely, if one source makes a very clear distinction then it will be harder for other sources to overcome it.

Consider the below example. Here are three possible inputs, which may be "ab" or "$a^b$". The linguistic model provides a score for each possibility, independent of what the data actually looks like, depending on which expression is more likely in the table generated by the training data for the linguistic model. The position score depends on how the elements are placed relative to each other. (The units here are arbitrary, and are based on a distance scale in which a lower score indicates a better match. The combination here is linear, but could use some other method.)

|  | ab | $a^b$ | ab | $a^b$ | ab | $a^b$ |
| --- | --- | --- | --- | --- | --- | --- |
| Linguistic: | 50 | 150 | 50 | 150 | 50 | 150 |
| Position: | 20 | 700 | 250 | 200 | 820 | 35 |
| Total: | 70 | 850 | 300 | 350 | 870 | 185 |
| Match: | ab |  | ab |  |  | $a^b$ |

With regard to a post-processing use of linguistic information vs. integrating it into the recognizer, consider the following input:

The recognizer may use linguistic information to help decide whether this is probably "ub" or "ab". Here are two rough sequences of actions for how the recognizer might run, first using post-processing and then using integrated linguistic scores. These sequences are for illustration only—there are many approaches to recognition which would consider various possibilities in different orders.

A Post-processing Sequence:

1. Look at the first stroke. It looks like an "a" or a "u"; give each a score based on the shape. Say "a" gets a score of 200 and "u" gets a score of 150.

2. Look at the second stroke. It looks like a "b", and it looks like it's next to the first stroke. Thus we generate the possibilities "ab" and "ub," with the latter having a slightly better score based on the first step.

3. Find the linguistic scores for the expressions "ab" and "ub", and combine them with the scores generated earlier. Suppose "ab" gets a significantly better linguistic score—then that would be the first choice result reported.

An integrated sequence:

1. Look at the first stroke. It may get a shape score of 200 as "a" and 150 as "u". Also consider the linguistic score for these characters in this position—suppose "a" has a linguistic score of 40 and "u" has a linguistic score of 130. Overall "a" is better, so we keep "a" and throw away "u".

2. The next stroke looks like a "b", right next to the first stroke. The first stroke is an a, so report "ab" as the most likely answer.

Which approach is better in an individual case depends on many things, including for example the relative cost of finding the linguistic score relative to the cost of running the rest of the system. The type of linguistic model may also be a consideration—for example to use a collocation model, it is necessary to wait until both characters are recognized, although if this were part of a much larger expression the system need not wait until the entire expression is recognized.

Match Model to the Typical Input

Linguistic models may be more closely matched to the typical input as follows: when people use mathematical notation for different purposes—as students in a more or less advanced course, or as physicists or mathematicians—the mathematical language they use is also somewhat different. This is clearest in the case of students—if a class has not yet gotten to matrices, matrices will be very unlikely in the input material from the class. There are more subtle but statistically valid distinctions in other cases. For example, physicists use the Planck's constant symbol h-bar far more often than mathematicians, and this has an effect on the model parameters. Thus there is an opportunity to increase the utility of the linguistic model by matching it to the input material. In effect, this is another form of adaptation.

Training Models for Different Input Sets

Models can be trained, as described above, using material which emphasizes one particular type of training data, leading to a number of models suitable for different situations. For students a model might be trained using particular textbooks as a primary training source. One could train models for mathematicians, physicists and chemists by using books and papers in those disciplines as training material. All this training happens "in the factory", before the system reaches the users. The result is a list of different linguistic models, each best suited to a particular discipline, course or level of sophistication. Users might find all of these models packaged with the recognizer, or the users might have another way to access the models appropriate to the application.

Choosing the Model

If a recognizer has a list of possible linguistic models to use, as described above, how does it know which to use? There are several possibilities.

The simplest way to choose an appropriate linguistic model is to prompt the user for selection. For example, students could specify which course they were working on. A more advanced user might ask to use the group theory model or the quantum physics model.

There are applications where it is not practical or desirable to prompt the user to select the desired model, for example, a system might be scanning and recognizing all the articles in an old journal, each article on a different subject. In this situation, an appropriate linguistic model may be determined by looking at the first part of the input data, and on that basis selecting a model which better matches the entire input than the generic model.

One way to measure how well a linguistic model matches a section of text is cross entropy. Cross entropy has been used in natural language processing for selecting a more specific model, and it works for mathematical linguistic models also. After recognizing an initial segment of the input, the system finds the cross entropy of that segment with each of a list of more specific linguistic models, and the system then uses the model with the lowest cross entropy for the rest of the job.

Recognizer

The present invention is not tied to a particular math recognizer; it works with any currently available recognizer and any future variation thereof. What follows is a description of an exemplary embodiment of a math recognizer used by the present invention.

Figure 6:
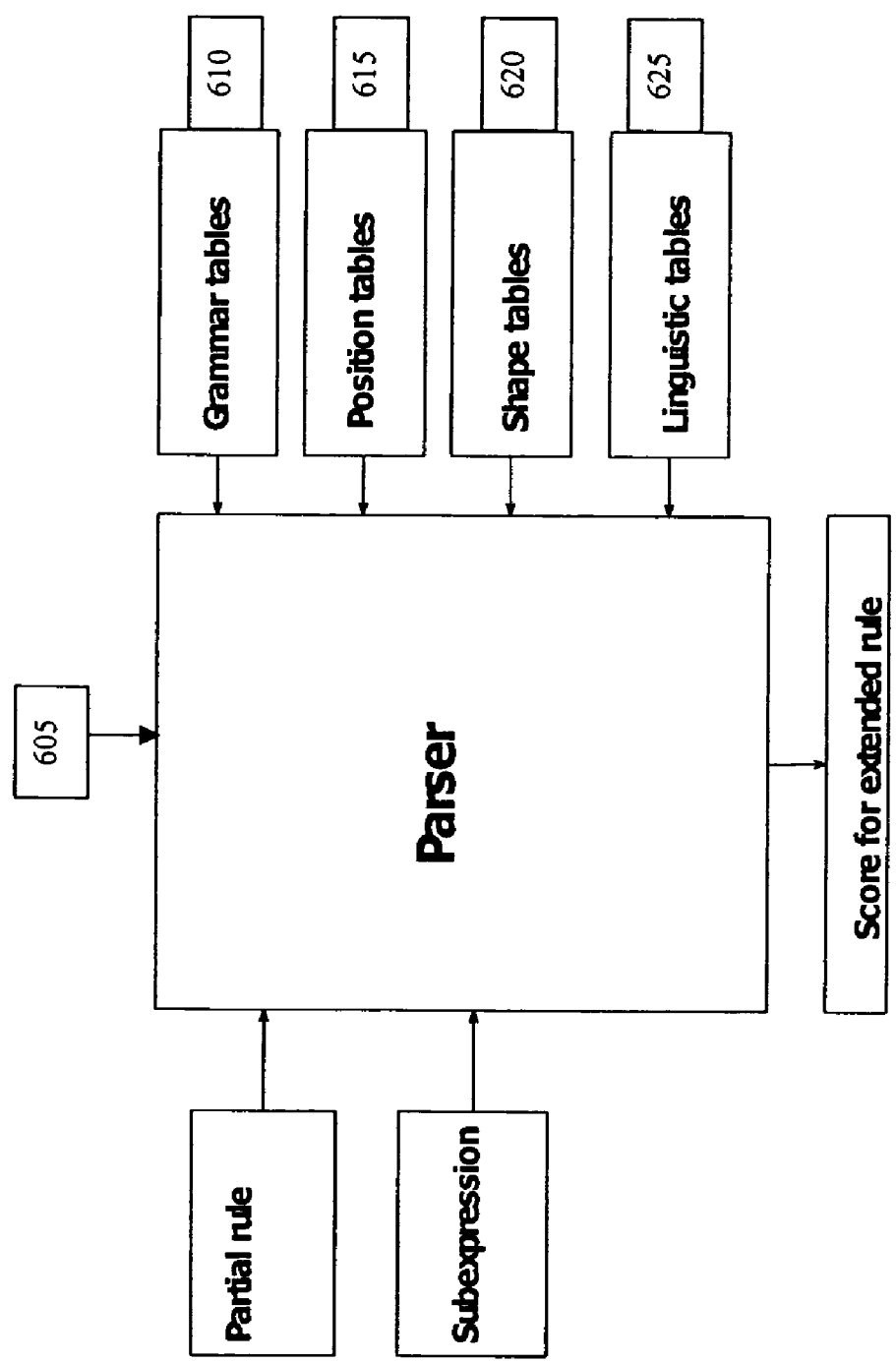
FIG. 6 depicts a block diagram embodying features of a recognizer adapted for use with the present invention.

FIG. 6 is a block diagram illustrating key components of a recognizer, including a parser 605. As shown, the recognizer includes a set of "tables" used by the recognizer to perform its work. A particular embodiment of the recognizer includes four main tables, including grammar tables 610, position tables 615, shape tables 620 and linguistic tables 625.

A grammar, which supplies the grammar tables 610, defines the types of expressions accepted, and contains information about how expressions should be interpreted.

A position model, which supplies the position tables 615, provides a way to judge how well input data fits a particular positional pattern, like exponent or subscript.

A shape model, which supplies the shape tables 620, provides a way to judge how much a sequence of input strokes looks like a particular character.

A linguistic model, which supplies the linguistic tables 625, provides a way to judge how well a proposed interpretation of the input data matches commonly used patterns of symbols and expressions.

Parser

The parser 605 is the fundamental system component in a recognition system which combines all this information to produce a best guess about the identity of a set of input strokes. The parser works in parallel on many different guesses about the identity of the input.

The parser is based on Earley's algorithm, a standard method, and includes extensions developed for the mathematical domain. These extensions include the use of a positional model, the use of an attribute system appropriate for mathematical notation, and methods for handling various orderings of the symbols in the input.

The basic parser operation is to take a partially recognized grammar rule, and a new piece of input, and determine how well this data matches the grammar rule with one more piece accepted. For example, the grammar rule for exponents might be something like expr: expr expr (plus other information)

That is, the rule says that an exponential expression is a sequence of two subexpressions. The other information includes things like the expected positions of the pieces, and so distinguishes this rule from others that superficially look the same, such as the rule for subscripts.

If during recognition the parser thinks it may have seen the first subexpression in the exponent rule, and can expect the other subexpression to be coming, it represents this with an object like expr: expr.expr (plus a score and other information)

where the dot indicates the stage at which the parser has recognized the rule. Given another possible subexpression (with its own score), the parser uses information in the four tables mentioned above to produce a score for a new object expr: expr expr. (plus a score)

which may equate to an exponential expression. The parser also considers other possibilities in parallel with the interpretation of the data as an exponential expression. These might include subscript expressions or multiplication; or the parser might interpret these pieces as parts of a larger expression. At the end of the input data the parser has a list of possible interpretations from the various parallel paths through the grammar, each with its own score. The parser returns the best one (or a list of the best few) as output.

Thus the fundamental parser operation is to take a partially recognized rule and a new subexpression, each with some score, and using the four tables find a score for the new object obtained by accepting the subexpression as the next element of the rule.

Hardware

Training System

Figure 7:
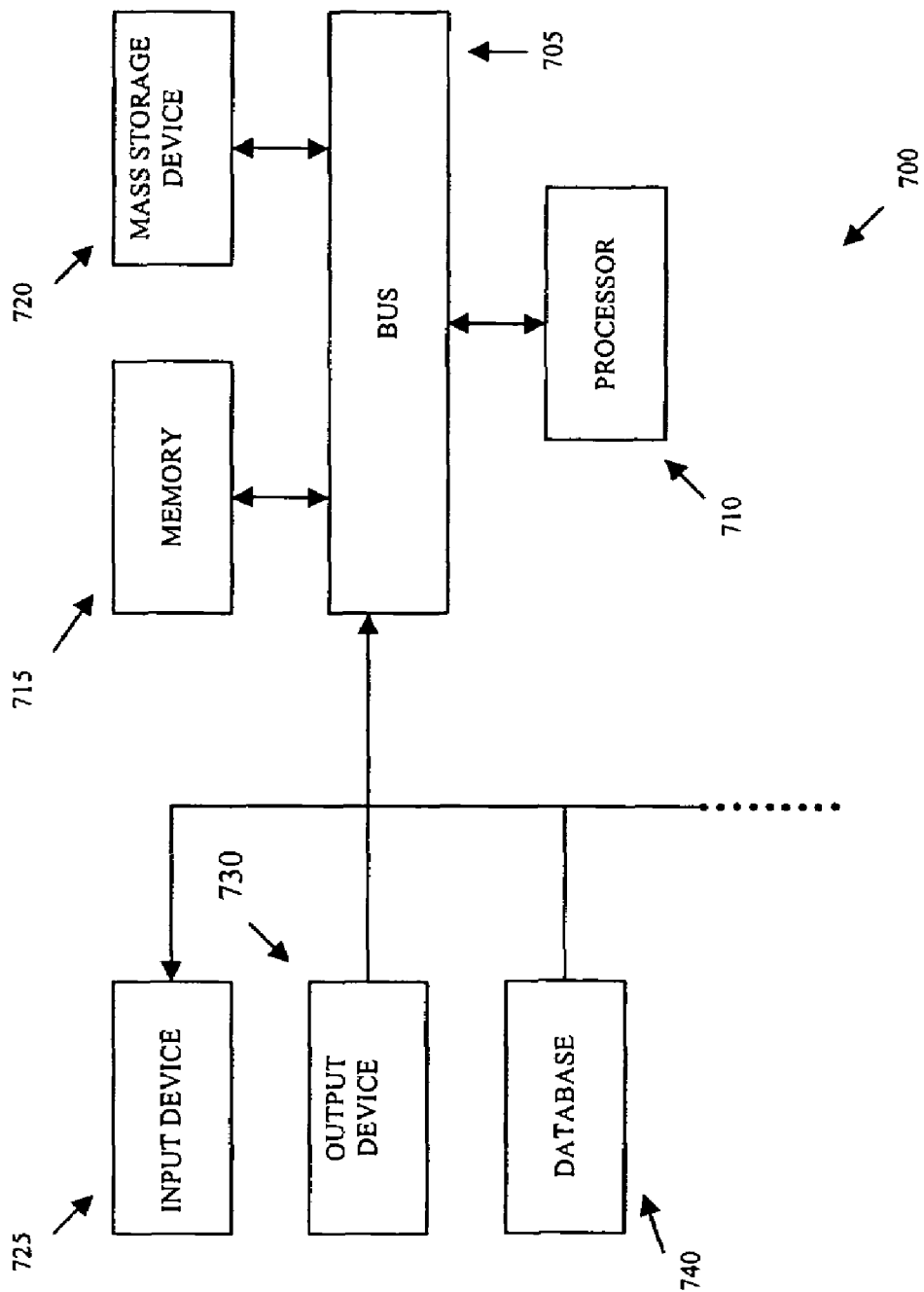
FIG. 7 is a block diagram illustrating an exemplary embodiment of a processor-controlled system on which the training portion of the present invention is implemented.

FIG. 7 illustrates an exemplary hardware configuration of processor-controlled system on which the present invention is implemented. One skilled in the art will appreciate that the present invention is not limited by the depicted configuration as the present invention may be implemented on any past, present and future configuration, including for example, workstation/desktop/laptop/handheld configurations, client-server configurations, n-tier configurations, distributed configurations, networked configurations, etc., having the necessary components for carrying out the principles expressed herein.

In its most basic embodiment, the system 700 comprises, but is not limited to, a bus 705 that allows for communication among at least one processor 710, at least one memory 715 and at least one mass storage device 720. The bus 705 is also coupled to receive inputs from at least one input device 725, such as a keyboard, a pointing device, etc, but is not limited thereby. The bus 705 provides outputs to at least one output device 730 such as a display device, a hard copy device, etc, but is not limited thereby. The at least one processor 710 is configured to carry out the methods described herein and shown generally in the preceding Figures.

In a preferred embodiment, the present invention makes use of conventional database technology 730 such as that found in the commercial product SQL Server™ which is marketed by Microsoft Corporation to store, among other things, the body of parse trees.

Recognizer

Figure 8:
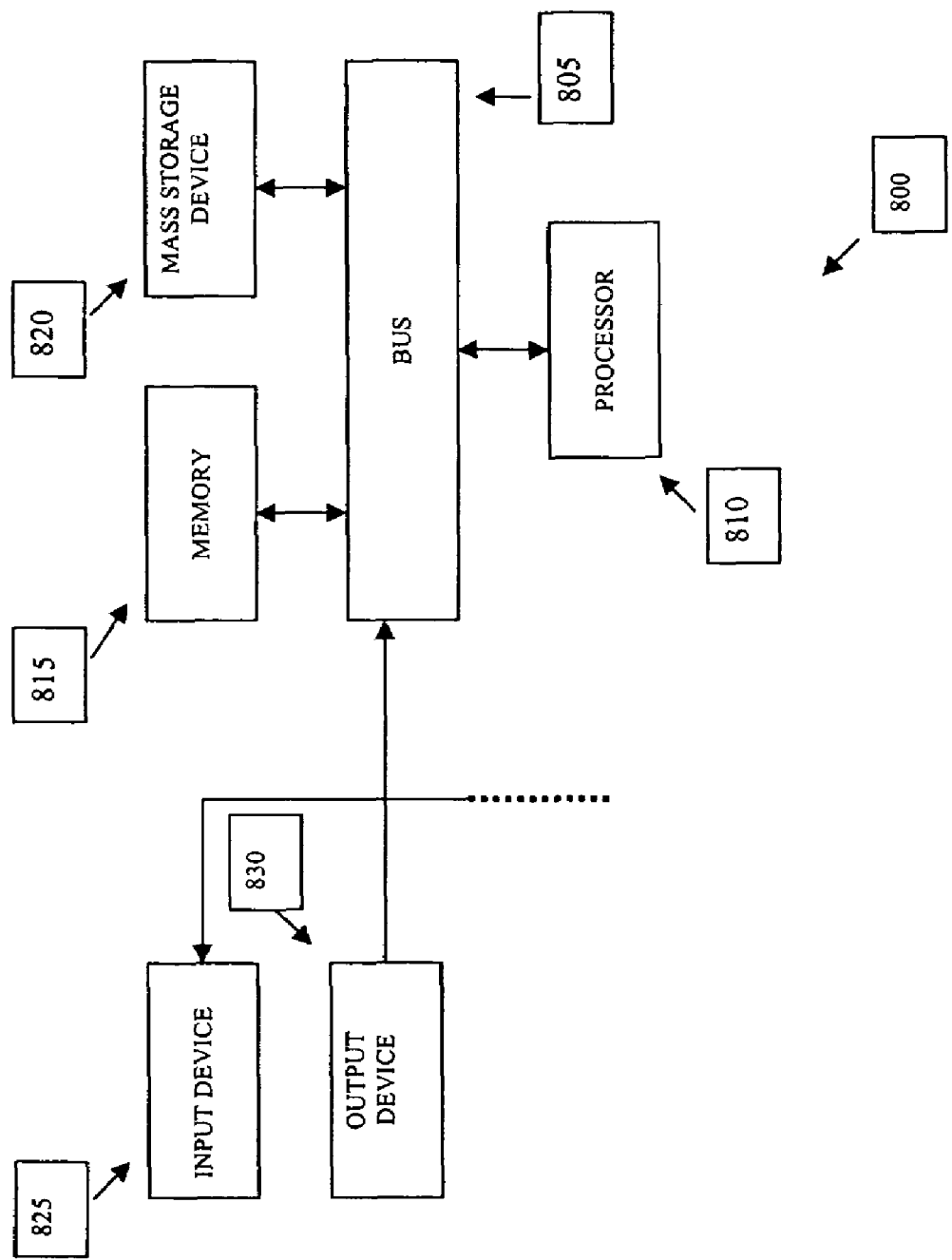
FIG. 8 is a block diagram illustrating an exemplary embodiment of a processor controlled system on which mathematical recognition is implemented in accordance with the teachings herein.

FIG. 8 illustrates an exemplary hardware configuration of a mathematical recognizer. One skilled in the art will appreciate that the depicted configuration of the recognizer is not limited by what is shown in FIG. 8, but also includes any past, present and future configuration, including for example, workstation/desktop/laptop/handheld configurations, client-server configurations, n-tier configurations, distributed configurations, networked configurations, etc., having the necessary components for carrying out the principles expressed herein.

In its most basic embodiment, the recognition system 800 comprises, but is not limited to, a bus 805 that allows for communication among at least one processor 810, at least one memory 815 and at least one mass storage device 820 for storing the various tables i.e., at least the grammar, shape position and linguistic tables. Optionally, the bus 805 is also coupled to receive inputs from at least one input device 825 and provide outputs to at least one output device 830.

CONCLUSION

Having now described a preferred embodiment of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents of similar purpose, unless expressly stated otherwise. Therefore, numerous other embodiments of the modifications thereof are contemplated as falling within the scope of the present invention as defined by the appended claims and equivalents thereto.

Moreover, the techniques may be implemented in hardware or software, or a combination of the two. In one embodiment, the techniques are implemented in computer programs executing on programmable computers that each include a processor, a storage medium readable by the processor (including volatile and non-volatile memory and/or storage elements), at least one input device and one or more output devices. Program code is applied to data entered using the input device to perform the functions described and to generate output information. The output information is applied to one or more output devices.

Each program is preferably implemented in a high level procedural or object oriented programming language to communicate with a computer system, however, the programs can be implemented in assembly or machine language, if desired. In any case, the language may be a compiled or interpreted language.

Each such computer program is preferably stored on a storage medium or device (e.g., CD-ROM, NVRAM, ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. A method of generating a linguistic table for storing information related to a linguistic model for use in mathematical expression recognition, comprising the steps of:
    providing a body of mathematical expressions;
    parsing said body of mathematical expressions to create a body of parse trees associated with a specific grammar to be used to train a linguistic model;
    selecting a linguistic model to be trained, said linguistic model having at least one associated linguistic event;
    training the linguistic model by associating with each of the at least one linguistic events a linguistic score based on determining the probability of occurrence of the at least one linguistic event in said body of parse trees;
    storing in said linguistic table information related to the at least one linguistic event and associated linguistic score, said linguistic table for use by a recognizer during recognition of mathematical expressions in said body of mathematical expressions.

2. A method as in claim 1 further comprising the steps of associating said linguistic table with a recognizer; said recognizer configured to select interpretations of its input which include higher linguistic scores.

3. A method as in claim 2 further comprising the step of modifying said linguistic table in accordance with said use of said recognizer, said recognizer utilizing said modified linguistic table in determining interpretations of its input.

4. A method as in claim 1, wherein said grammar is a context free grammar.

5. A method as in claim 1 wherein said linguistic model is chosen from the group consisting of a stochastic grammar model, an n-gram model, a rule context model, a collocation model and other basic linguistic model types.

6. A method as in claim 1 wherein said linguistic model is a combination of two or more linguistic models.

7. A method as in claim 6 wherein said body of mathematical expressions includes a set of distinct sub-expressions comprising exponents, subscripts, and function arguments, and wherein each of said two or more linguistic models are trained from one or more members of said set of distinct sub-expressions.

8. A method as in claim 1 wherein said body of mathematical expressions is a subset of mathematical expressions meeting a certain specification.

9. A method as in claim 8 wherein said certain specification comprises the type of mathematics represented by said body of mathematical expressions, the level of mathematics represented by said body of mathematical expressions or the type of users of said body of mathematical expressions.

10. A method as in claim 1 wherein said linguistic model is a rule context model having associated linguistic events of symbols and rules, said body of parse trees comprising a body of collapsed parse trees having a plurality of nodes including a root node and internal nodes, said linguistic scores based on determining the probability that a linguistic event occurs at said root node; for each internal node of said collapsed parse tree, determining the probability that a linguistic event occurs at said internal node; and multiplying said foregoing probability occurrences.

11. The method of claim 1, wherein the probability of occurrence of the at least one linguistic event in the body of parse trees is based on counting the number of times the at least one linguistic event occurs in the body of parse trees.

12. The method of claim 11, wherein the probability of occurrence for the at least one linguistic event is modified by applying one or more of a smoothing algorithm and a scaling algorithm.

13. The method of claim 1, wherein the probability of occurrence of the at least one linguistic event is mapped to a linguistic score using a negative log probability.

14. The method of claim 1, wherein the body of parse trees represents a first body of parse trees and further comprising the steps of:
    providing a second body of mathematical expressions;
    parsing said second body of mathematical expressions to create a second body of parse trees associated with the specific grammar;
    training the linguistic model by associating with each of the at least one linguistic events a combined linguistic score based on a weighted probability determined by combining the probability of occurrence of the at least one linguistic event in the first body of parse trees and the probability of occurrence of the at least one linguistic event in the second body of parse trees,
    wherein said linguistic table further stores information related to the at least one linguistic event and associated combined linguistic score and wherein the recognition of mathematical expressions further includes the second body of mathematical expressions.

15. The method of claim 14, wherein the probability of occurrence of the at least one linguistic event in the second body of parse trees is weighted by the number of parse trees in the second body of parse trees.

16. A system for generating a linguistic table for storing information related to a linguistic model for use in mathematical expression recognition, comprising:
a processor configured to:
receive a body of mathematical expressions;
parse said body of mathematical expressions to create a body of parse trees associated with a specific grammar to be used to train a linguistic model;
determine a linguistic model to be trained, the linguistic model having at least one associated linguistic event;
train said linguistic model by associating with each of the at least one linguistic events a linguistic score based on determining the probability of occurrence of the at least one linguistic event in said body of parse trees; and
during the training, store in the linguistic table information related to the at least one linguistic event and associated linguistic scores, the linguistic table for use by a recognizer during recognition of mathematical expressions in the body of mathematical expressions.

17. A system as in claim 16, wherein said grammar is a context free grammar.

18. A system as in claim 16 wherein said linguistic model is chosen from the group consisting of a stochastic grammar model, an n-gram model, a rule context model, a collocation model and other basic model types.

19. A system as in claim 16 wherein said linguistic model is a combination of two or more linguistic models.

20. A system as in claim 19 wherein said body of mathematical expressions includes a set of distinct sub-expressions comprising exponents, subscripts, function arguments, etc, and wherein each of said two or more linguistic models are trained from one or more members of said set of distinct sub-expressions.

21. A system as in claim 16 wherein said body of mathematical expressions is a subset of the mathematical expressions meeting a certain specification.

22. A system as in claim 21 wherein said certain specification comprises the type of mathematics represented by said body of mathematical expressions, the level of mathematics represented by said body of mathematical expressions or the type of users of said body of mathematical expressions.

23. A system as in claim 16 wherein said linguistic model is a rule context model having associated linguistic events of symbols and rules, said body of parse trees comprising a body of collapsed parse trees having a plurality of nodes including a root node and internal nodes, said processor further configured to:
determine linguistic scores based on determining the probability that a linguistic event occurs at said root node;
determine linguistic scores based on determining the probability that a linguistic event occurs at each said internal node; and
multiply said linguistic scores of linguistic events at said root node and each said internal node.

24. A recognizer of mathematical expressions having at least shape and positional criteria, and further comprised to accept linguistic criteria based on a rule context model comprised of associated linguistic events of rules and symbols, and a body of parse trees comprising a body of collapsed parse trees having a plurality of nodes including root nodes and internal nodes, the rule context model comprising:
a linguistic event for the occurrence of a root rule or symbol in the body of collapsed parse trees;
a linguistic score for the linguistic event of the root rule or symbol based on the probability of the linguistic event in the collapsed body of parse trees;
at least one root node comprising the root rule or symbol and the linguistic score for the root rule or symbol, and at least one internal node representing rule positions of the root rule, the rule positions further comprising an internal rule or symbol;
a linguistic event for the occurrence of each internal node of each root node;
a linguistic score for the linguistic event of each internal node of each root node based on the probability of the internal node rule position in the collapsed body of parse trees; and
a probability of the root node determined by multiplying the linguistic score of the root node with the linguistic score of each internal node of the root node.

25. A recognizer as in claim 24 wherein said linguistic criteria are further derived from a combination of a rule context model and a collocation model.

26. A recognizer as in claim 24 wherein said linguistic criteria are modified in accordance with said use of said recognizer, said recognizer utilizing said modified linguistic criteria in determining interpretations of its input.

27. A rule context model comprised of associated linguistic events of rules and symbols, and a body of parse trees comprising a body of collapsed parse trees having a plurality of nodes including root nodes and internal nodes, the rule context model comprising:
a linguistic event for the occurrence of a root rule or symbol in the body of collapsed parse trees;
a linguistic score for the linguistic event of the root rule or symbol based on the probability of the linguistic event in the collapsed body of parse trees;
at least one root node comprising the root rule or symbol and the linguistic score for the root rule or symbol, and at least one internal node representing rule positions of the root rule, the rule positions further comprising an internal rule or symbol;
a linguistic event for the occurrence of each internal node of each root node;
a linguistic score for the linguistic event of each internal node of each root node based on the probability of the internal node rule position in the collapsed body of parse trees; and
a probability of the root node determined by multiplying the linguistic score of the root node with the linguistic score of each internal node of the root node.

* * * * *